US006953181B2

(12) United States Patent
Vodicka

(10) Patent No.: US 6,953,181 B2
(45) Date of Patent: Oct. 11, 2005

(54) BICYCLE RACK HOLDER

(76) Inventor: Robert Vodicka, 624 Riedy Rd., Lisle, IL (US) 60532

( * ) Notice: Subject to any disclaimer, the term of this patent is extended or adjusted under 35 U.S.C. 154(b) by 170 days.

(21) Appl. No.: 10/356,795

(22) Filed: Feb. 3, 2003

(65) Prior Publication Data

US 2005/0173356 A1 Aug. 11, 2005

(51) Int. Cl.[7] .............................................. F16M 13/00
(52) U.S. Cl. ....................... 248/544; 224/402; 280/166
(58) Field of Search ....................... 248/544, 511, 519, 248/539, 121, 357, 354.6, 354.5; 224/519, 224/402; 280/166

(56) References Cited

U.S. PATENT DOCUMENTS

| | | | | |
|---|---|---|---|---|
| 4,676,413 A | * | 6/1987 | Began et al. ................ 224/532 |
| 5,094,373 A | * | 3/1992 | Lovci .......................... 224/509 |
| 6,460,745 B1 | * | 10/2002 | Weaver ....................... 224/519 |
| 6,547,115 B1 | * | 4/2003 | Kato et al. .................. 224/496 |
| 6,644,525 B1 | * | 11/2003 | Allen et al. ................. 224/497 |
| 6,662,983 B2 | * | 12/2003 | Lane et al. ................. 224/405 |
| 2003/0201289 A1 | * | 10/2003 | Swain ......................... 224/519 |

* cited by examiner

*Primary Examiner*—Ramon O Ramirez
(74) *Attorney, Agent, or Firm*—Basil E. Demeur; Alan B. Samlan; David J. Hurley

(57) ABSTRACT

There is disclosed a universal bracket carrying bicycles, a rack consisting of a base plate, a stanchion fixedly secured to the base plate, a carrying tube having a carrying end and a second end, the second end having a second carrying tube secured thereto and the carrying tube further including a mount tube secured to thereto and extending downwardly therefrom, the mount tube being sized to override and sliding mount on the stanchion of the base plate and be rotatable with respect thereto.

6 Claims, 5 Drawing Sheets

BICYCLE RACK HOLDER

BACKGROUND TO THE INVENTION

The present invention relates to a universal bracket particularly suitable for mounting a complete bicycle rack thereon. The bracket is denoted as a universal bracket since it is adapted to be mounted on either a vertical underlying support surface, or a horizontal underlying support surface. Furthermore, the bracket accommodates the removal of the entire bicycle rack from a typical mounting such as a vehicle hitch, and the entire rack then mounted onto the universal bracket without the need of first removing the bicycles from the rack. The advantage of the present universal bracket will be better understood with reference to the specifications set forth herein below.

Bicycle racks are generally well known, and are greatly in use. The typical bicycle rack is employed in order to transport bicycles on the rear of a vehicle by inserting the bicycle rack into a vehicle hitch and locked into position by means of a lock bolt. The typical vehicle hitch is formed from a square shaped steel tube which is generally mounted to the vehicle by means of a bolt arrangement or by welding. The bicycle rack generally includes a square shaped mount bar, which may be inserted into the vehicle hitch bar and bolted into position. The typical reason for employing square shaped configuration is so that the mount bar of the bicycle rack does not rotate relative to the vehicle hitch. It is also well known that the typical bicycle rack will accommodate one or more bicycles generally in hanging brackets which are formed as a part of the rack. The bicycle is positioned into the hanging brackets and locked into position by means of lock brackets, straps or the like.

It is also well understood that once the vehicle has taken the bicycles to a desired riding location, the bicycles are removed from the rack for the user to utilize for their pleasure. However, there are other applications where it would be convenient and desirable to remove the bicycle rack from one type of vehicle and transported to another without having to remove the bicycles from the rack, tear down the rack, and move it to another location and then reinsert the bikes onto the rack. For example, persons that are interested in taking their bicycles to a dock, and then removing the bikes from the vehicle rack to a boat generally requires that the bicycle rack remain on the vehicle hitch and the bicycles then taken down to a dock from which they are then placed onto a boat. As a matter of convenience, however, it has been found to be desirable to have the bicycle rack positioned on the dock so that the bicycles may be alternatively taken aboard the boat and removed from the boat without the need of having to take the bicycles back to the vehicle where the rack is located. Other applications are envisioned where it is desired to move the entire bicycle rack from one vehicle to another or from one location to another. Another example is to remove the bicycle rack from the vehicle hitch bar and to place it into a storage area such as a garage in its totality.

For the above reasons, it has been considered a desired accessory to develop a universal bracket which will accommodate the mounting an entire bicycle rack so that the bicycle rack can be moved in total from one location or vehicle to another. The prior art generally discloses the different types of bicycle racks or racks that are constructed in a particular manner, such as U.S. Pat. No. 5,004,133 which is directed to a detachable article carrier such as a bicycle rack. The rack is constructed so as to attach to a vehicle hitch which basically is of the type carrying a ball generally used for towing a trailer. The particular rack of U.S. Pat. No. 5,004,133 is designed to attach to the aperture in which the ball is positioned, primarily by removing the ball and bolting the bicycle rack to the hitch. It is clear that such a bicycle rack is difficult to remove since it requires the unbolting of the entire rack from the hitch, and furthermore, the art does not deal with a universal bracket to which the entire bicycle rack may be moved and mounted.

Similar comments are applicable with respect to U.S. Pat. No. 5,730,345. This patent illustrates still another alternative form of a bicycle rack which has telescopic inner connections with a receiver type trailer hitch. It would appear as though the principle purpose of the bicycle rack as disclosed in the '345 patent is to permit the entire rack to be pivotally moved to an access position so that the user can access the trunk area of the vehicle.

U.S. Pat. No. 4,057,182 is directed to a particular form of a bracket for mounting within the bed of a truck which permits the carrying of a motorcycle in a secure position. There is no indication as to the movability of the carrying rack from the truck to an alternate bracket.

Other patents which show intermediate brackets for performing a particular function are also disclosed. For example, U.S. Pat. No. 6,390,489 is directed to a hitch for attaching a trailer or a cart to a forklift. The intermediate bracket is provided which is designed particularly for the purpose of permitting a forklift operator to move an entire trailer by providing an intermediary bracket. The bracket is provided with a mounting aperture and the tine is provided with a corresponding aperture such that once the tine of the forklift is inserted into the bracket, it may be bolted into position and the fork truck can then move the trailer.

While each of these patents deals with particular racks and/or mounting brackets, the art has not dealt with the advisability or functionality of providing a universal bracket for moving an entire bicycle rack from a vehicle hitch to an alternate mounting position by use of a universal bracket. Furthermore, the bracket of the present invention is useful in that it can be mounted vertically on a vertical support surface, or horizontally, on a horizontal support surface. Hence, the bracket of the present invention may either be employed such as for example, on the wall of a garage, and similarly on a horizontal support surface such as a boat dock.

OBJECTS AND ADVANTAGES

The primary object of the present invention is to provide a universal bracket for permitting movement of an entire bicycle rack from one location such as a vehicle hitch, to an alternate location by the movement of the entire rack to permit the mounting thereof in a manner similar to the mounting of the rack on the vehicle hitch.

In furtherance of the foregoing object, it is a object of the present invention to provide a universal bracket which is formed by a base plate, a stanchion fixedly secured to and upstanding from the base plate, a carrying tube having a carrying end and a second end, the second end having a second carrying tube secured thereto and extending therefrom at a 90 degree angle, the carrying tube further including a mount tube secure thereto and extending downwardly therefrom, the mount tube being sized to override and slidingly mount onto the stanchion of the base plate, and be rotatable with respect thereto and, lock means as between the stanchion and the mount tube such that carrying tube may be mounted relative to the base.

In conjunction with the foregoing object, it is further object of the present invention to provide a universal bracket of the type described, wherein the mount tube of the carrying tube are each provided with a plurality of lock apertures such that the carrying tube may rotate to any one of a number of desired positions, and locked into place.

A further object of the present invention, in the accordance with the above objects, is to provide a universal bracket of the type described wherein the base plate is further provided with a vertical lateral support plate fixedly secured thereto and extending downwardly therefrom at a 90 degree angle such that the universal bracket may be mounted on a right angle underlying support surface with the vertical support plate including mounting apertures such that the base plate and vertical support plate may both be bolted to the underlying support surface.

Further objects and features of the invention will be better understood by reference to the following specification taken in conjunction with the drawings.

SUMMARY OF THE INVENTION

The present invention provides a universal bracket which permits a bicycle rack to be removed from a vehicle hitch, without the need for any disassembly or bike removal, and the entire rack removed to an alternate site and remounted on the universal bracket. The bracket is designed such that it may be mounted on a vertical underlying support surface or a horizontal underlying support surface, while still maintaining the rack in an upright position. In this manner, the bicycles do not have to be removed from the rack prior to the removal of the entire rack from one vehicle hitch, and inserted onto the universal bracket. The advantageous features of the present invention are attained by providing a bracket formed by a base plate having a stanchion upstanding therefrom and fixedly secured to the base, and a carrying tube which is formed by a first carrying tube having a mount tube fixedly secured thereto extending downwardly therefrom, adjacent one end of the carrying tube, and a second end which carries a second carrying tube fixedly secured thereto in position at a 90 degree right angle to the first carrying tube. Hence, once it is determined what type of underlying support surface the base plate of the universal bracket is mounted on, whether horizontal or vertical, one determines whether to use the first or second carrying tube for mounting the mount bar of the bicycle rack therein. In that manner, the bicycles carried on the rack will always be maintained in an upright position.

DETAILED DESCRIPTION

Figure 1:
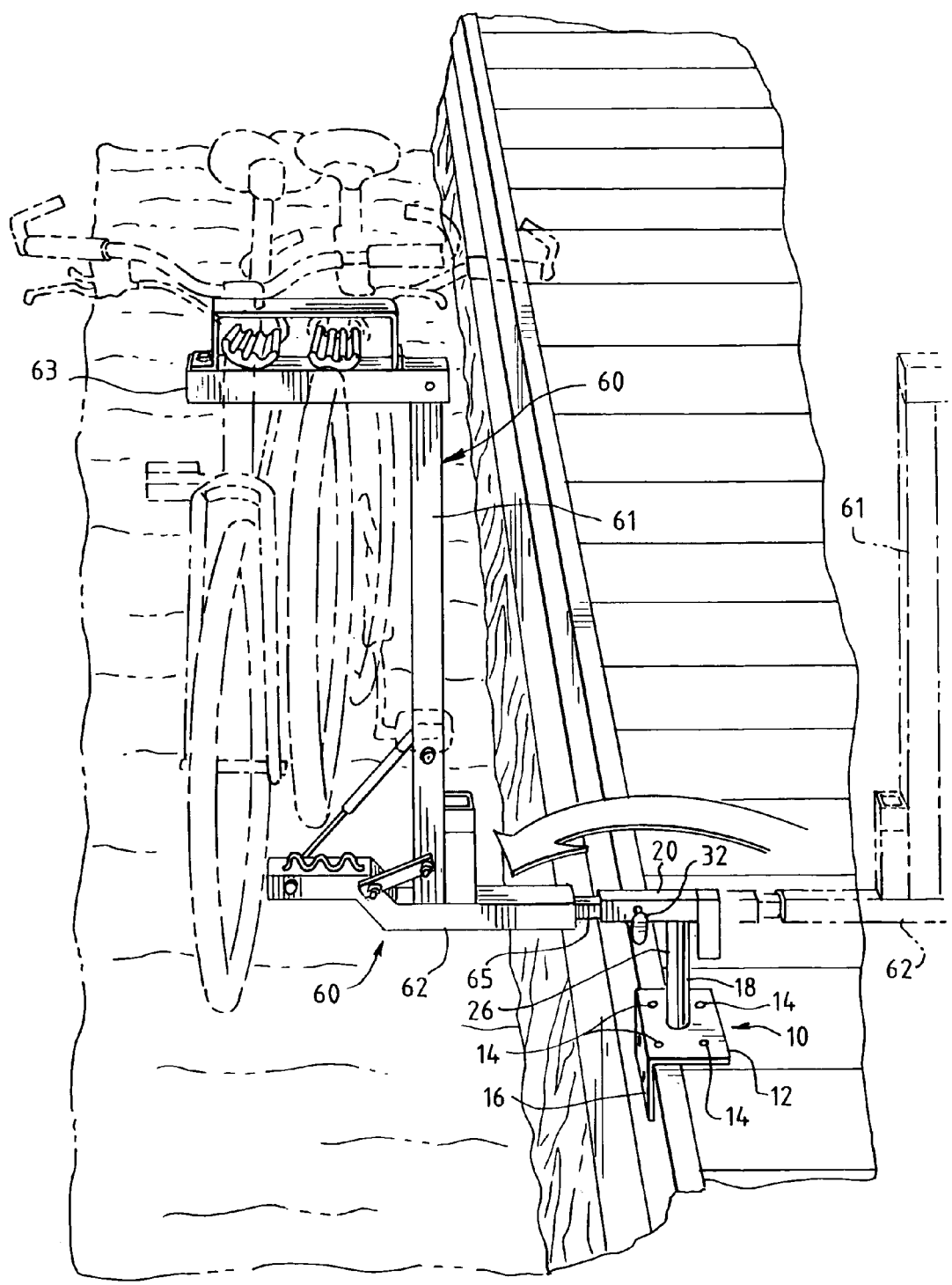
FIG. 1 is a perspective view showing a universal bracket having a bicycle rack, attached thereto as mounted on a boat dock, the universal bracket having a vertical support plate associated therewith.

FIGS. 1–4 of the drawings depict the universal bracket 10 of the present invention. The usefulness of the present invention is intended to permit a user to remove a bicycle rack from a typical vehicle hitch, and to mount the entire rack on the universal bracket which is positioned in any desired location. FIG. 5, a typical vehicle 50 illustrated, the vehicle 50 provided with a vehicle hitch 52. As customary in the art, the vehicle hitch 52 generally assumes a square shaped tubular configuration and is adapted to receive a bicycle rack therein. FIG. 5 shows a typical bicycle rack 60 which is typically formed by an upright 61 carried on a support tube 62, the upright 61 having a bicycle hanging bar 63 mounted thereon (FIG. 1) for carrying one or more bicycles. As illustrated in FIG. 1 and FIG. 5 drawings, the bicycle rack may be adapted for pivotal movement in order to afford the user the opportunity to move the bikes in an out of the way location. As shown in both FIGS. 1 and 5 of the drawings, the bicycle rack generally includes a mount bar 65 which is received by the vehicle hitch 52 for mounting the rack thereon. The typical reason for having a square shaped tubular vehicle hitch with a correspondingly square shaped tubular mount bar is to prevent the rotational movement of the bicycle rack 60 relative to the vehicle hitch 52. The present invention is adapted to utilize the square shaped mount bar 65 of a typical bike rack 60 to accommodate the mounting thereof to the universal bracket 10.

Figure 2:
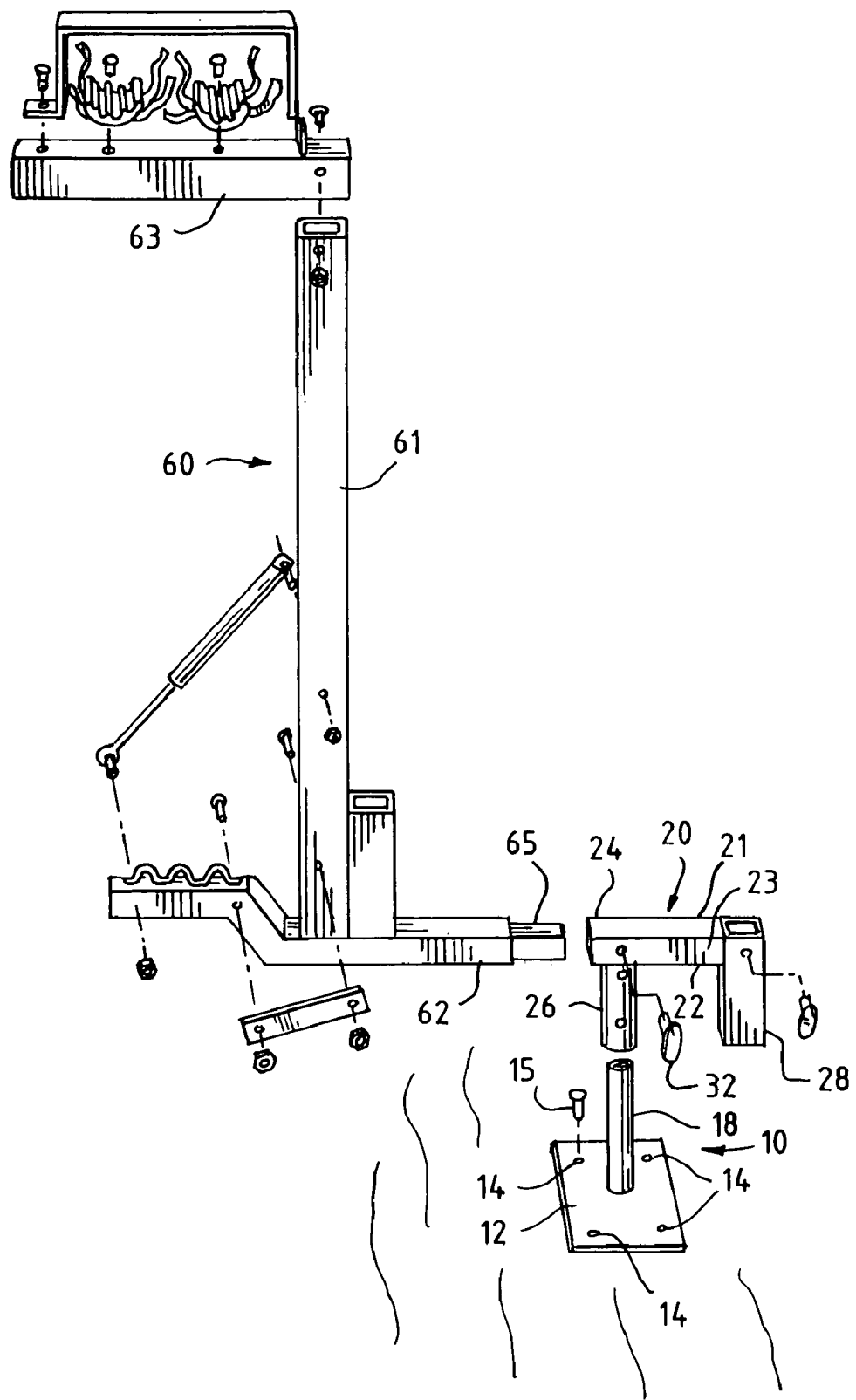
FIG. 2 having a perspective view showing a universal bracket of the present invention showing the carrying tube with its mount tube positioned over the stanchion of the support base plate, and having a second carrying tube mounted at the second end of the first carrying tube, suitable for mounting on a horizontal support surface.
Figure 3:
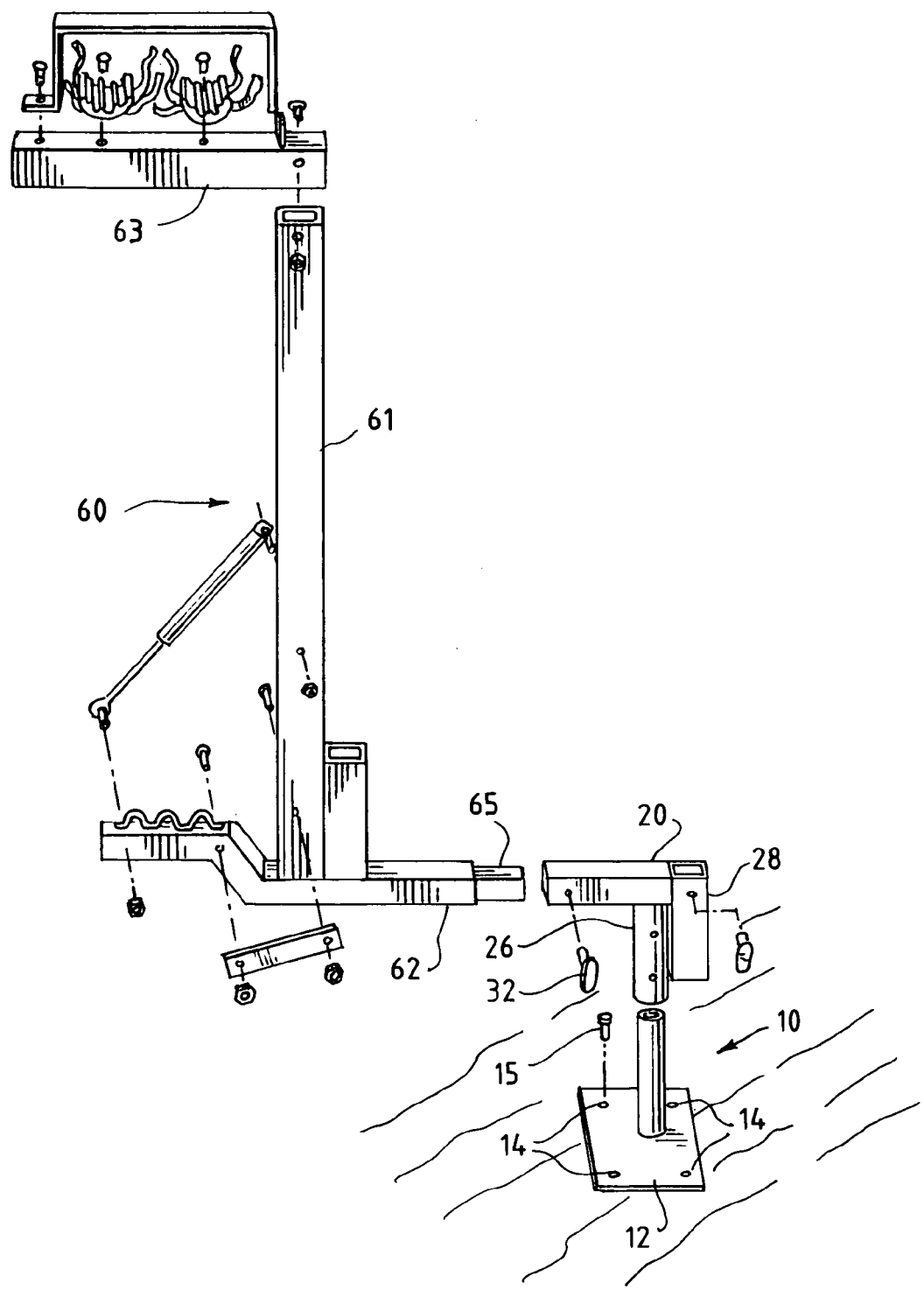
FIG. 3 is a perspective view showing a universal bracket of the present invention with an alternate embodiment insofar as the mounting of the second carrying tube with respect to the first carrying tube, the second carrying tube being mounted to the second end of the first carrying tube and extending downwardly therefrom and adjacent to the mount tube.
Figure 4:
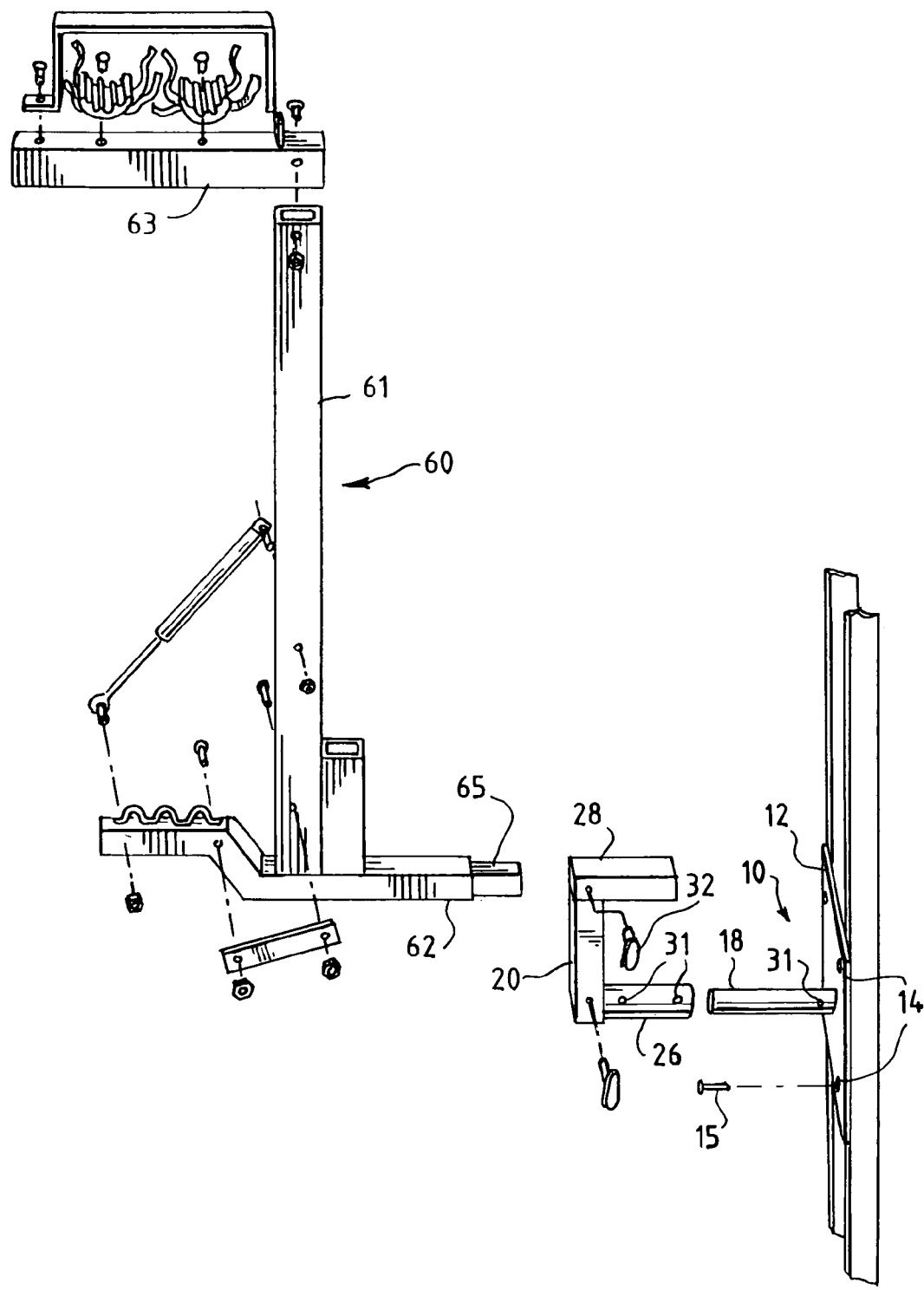
FIG. 4 is a perspective view showing the universal bracket of the present invention as mounted on a vertical underlying support surface, and the manner in which the second carrying tube would be employed for mounting the bicycle rack thereto.
Figure 5:
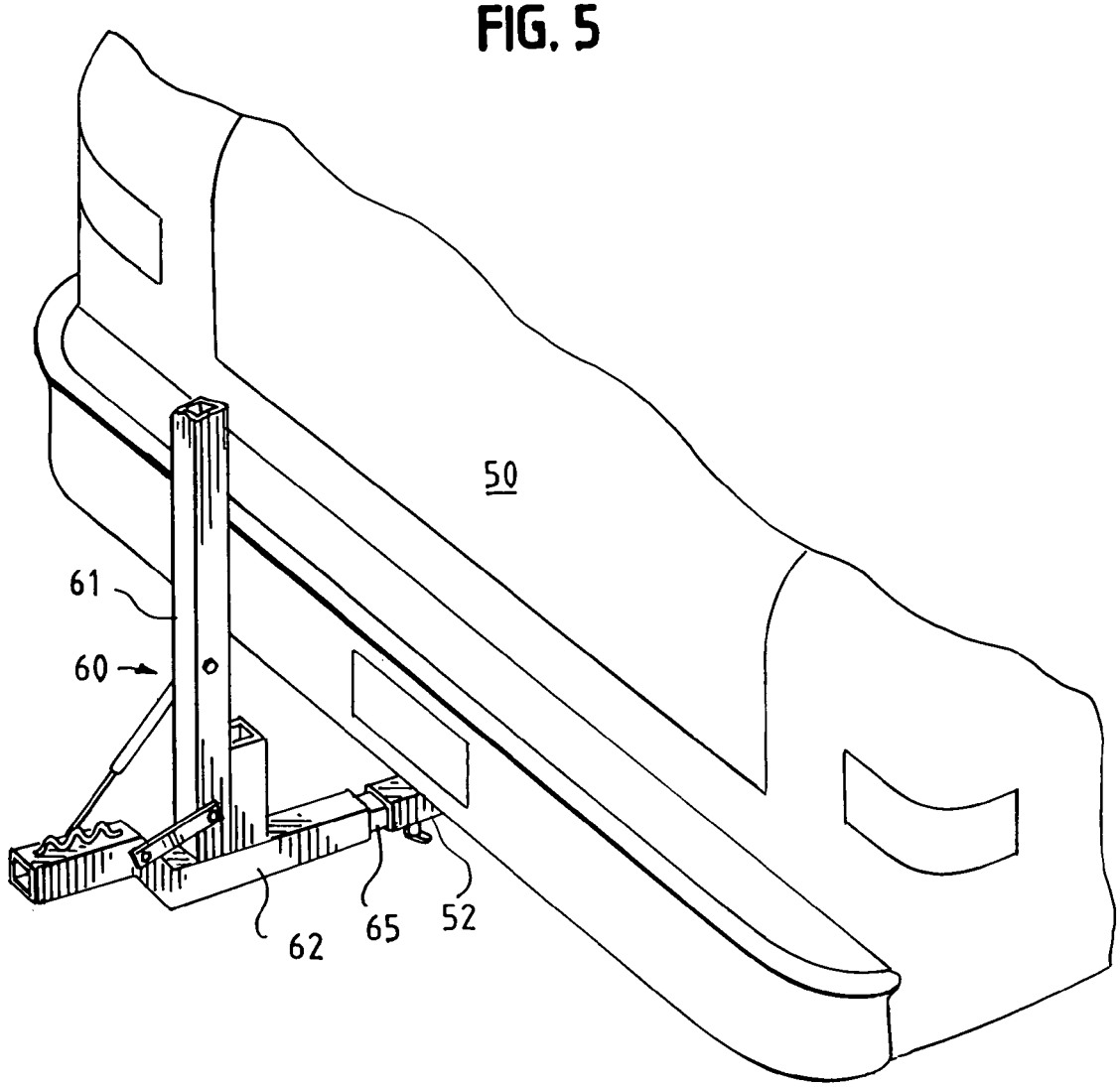
FIG. 5 shows a typical vehicle hitch mounted on a vehicle, for accommodating the bicycle rack in mounting position thereon.

FIGS. 2–4 of the drawings illustrate the universal bracket 10 of the present invention. The universal bracket 10 is shown to be formed by a base support plate 12 which is provided with a series of mounting apertures 14 thereby to accommodate a bolt 15. In this manner, the base support plate 12 may be mounted to a vertical underlying support surface as illustrated in FIGS. 2 and 3 of the drawings.

The universal bracket 10 shown to include a stanchion 18 which is fixedly secured to the base support plate 12 and extends upwardly therefrom. The stanchion will generally be of a circular configuration for a purpose to be defined more fully hereinafter. The upper portion of the universal bracket 10 is shown to include a first carrying tube 20 which assumes a square shaped configuration as illustrated in FIGS. 2–4. Since the first carrying tube 20 assumes a square shaped configuration, it has four sides including a top side 10 bottom side 2, and an opposed sidewalls 23 and 24 respectfully. The first carrying tube 20 is provided with a mount tube 26 which is fixedly secured to the bottom wall 22 thereof, and extends downwardly therefrom. The mount tube 26 also assumes a circular configuration and is sized in order to override and slidingly engage the stanchion 18. The first carrying tube is provided with a second carrying tube 28 which is fixedly secured thereto and positioned at a 90 degree right angle relative to the first carrying tube 20.

FIGS. 2 and 3 show two alternate mounting positions or arrangements as between the first carrying tube 20, mount tube 26, and second carrying tube 28. In FIG. 2, the second carrying tube 28 is mounted at the backside of the first carrying tube 20 and at a distance spaced from the mount tube 26. FIG. 3, shows that the mount tube 26 may be mounted adjacent to the back end of the first carrying tube 20, and the second carrying tube 28 is mounted and carried in a position adjacent to but slightly spaced rearedly from the mount tube 26. It is important that a spaced apart relationship exists between the mount tube 26 and the second carrying tube 28 in order to accommodate the rotational movement of the mount tube 26 relative to the stanchion 18.

As is further illustrated in FIGS. 2 and 3 of the drawings, and as will become apparent from comparing FIGS. 2 and 3 with FIG. 5, the bicycle rack 60 may be removed from the vehicle 50 in total, and simply carried over to and mounted to the first carrying tube 20 of the universal bracket 10. It will be appreciated that the bicycle rack 60 is thereby maintained in an upright position and the bicycles maintained similarly in an upright position. FIG. 4 of the drawings illustrates the universal bracket as mounted in a vertical disposition such as on a wall. In this mounting position, the base support plate 12 is mounted in a vertical disposition and bolted to a support wall in a manner well known in the art. The mount to 26 is then slidingly engaged over the stanchion 18 and locked into position in a manner which will be described here below. In this mounting position, the bicycle rack 60 may be mountingly secured to the second carrying tube 28 in order to be maintained in its upright position.

As is illustrated in FIGS. 2–4 of the drawings, the mount tube 26 may be lockingly engaged to the stanchion 18 by providing both the stanchion 18 as well as the mount tube 26 with appropriate locking apertures 31 through which a lock bolt 32 may be inserted. It will therefore be appreciated that once the mount tube 26 is slidingly mounted on the stanchion 18, the entire bicycle rack may be rotatably moved to a desired position until the appropriate locking apertures 31 are in registry, after which the lock bolt is simply placed through the apertures to lock the entire structure together. It will be appreciated that the stanchion 18 and mount tube 26 may be provided with a series of locking apertures 31 located circumferentially around the respective structures such that the entire rack may be rotatably moved by moving the mount tube 26 relative to the stanchion 18 until appropriate locking apertures 31 are in registry after which a lock bolt 31 is inserted to lockingly engage the structure together.

With specific reference to FIG. 1 the universal bracket 10 of the present invention may further be provided with a vertical support plate 16 which is fixedly secured to the base of plate 12 along a side edge thereof. As shown in FIG. 1, the provision of a vertical support plate 16 accommodates a more secure mounting of the universal bracket 10 when mounted on a right angle underlying support surface. The depiction in FIG. 1 is intended to convey the mounting of the universal bracket 10 on a boat dock where the entire bracket is bolted to the side of the dock. The advantages of this structure is that the entire bracket may be rotated into a position wherein the bicycle rack is overhanging the dock and positioned so that the bicycles may be removed from or inserted onto the rack from a boat, after which the operator may then enter onto the dock surface, and rotate the entire rack 180 degrees to a position which is non-obstructive with respect to the dock and any Hence, bicycles may be easily removed from a boat, or carried onto the boat, by simply rotating the rack into the desired position thereby eliminating the need for the operator to attempt to carry each bicycle from the dock onto the boat or off of the boat. The application described above may certainly be applied to other applications where a user desires to transport bicycles from one location to another.

The depiction in FIG. 4 of the drawings is intended to illustrate the manner in which the universal bracket 10 of the present invention may be mounted on a wall structure such as a garage wall, and for security purposes, the entire bicycle rack may be removed from the vehicle hitch as illustrated in FIG. 5, and brought into a garage and mounted onto a universal bracket 10. Hence, the user has flexibility in terms of the placement of the entire bicycle rack without the need of disassembling or removing the bicycles from the rack in order to accommodate the movement of the entire rack.

It would be appreciated from the above description that the universal bracket of the present invention provides a convenience and easy to use bracket for moving a bicycle rack from a vehicle hitch to an alternate location providing the user with the ability to have the rack available for carrying the bikes regardless of where the alternate location may be located.

While there has been described what is present and considered to be the preferred embodiments of the invention, it will be understood that various modifications may be made therein and it is intended to cover in the appended claims all such modifications as fall within the true spirit and scope of the invention.

What is claimed is:

1. A universal bracket for accepting and carrying a bicycle rack thereon, the bicycle rack being of type having a square shaped mount bar associated therewith for mounting onto a typical vehicle hitch and provided with hanging brackets for lockingly hanging at least one bicycle therefrom, the universal bracket being capable of mounting on a vertical underlying support surface and a horizontal underlying support surface, comprising, a support base formed by a flat plate bounded by side edges and having mounting apertures formed therein, a stanchion fixedly mounted on said base extending upwardly therefrom, a first carrying tube provided with a mount tube carried thereon and extending downwardly therefrom, said mount tube being sized to override and slidingly mount onto said stanchion and be rotatable with respect thereto, a second carrying tube fixedly secured to set first carrying tube at a 90° angle with respect thereto, and lock means provided as between said stanchion and said mount tube to lockingly engage said mount tube to said stanchion in a desired rotated position, whereby said bicycle rack maybe removed from a vehicle hitch and positioned on one of said carrying tubes tube by inserting said mount bar of the bicycle rack in one of said first and second carrying tubes and lockingly engaged in position without first removing the bicycles therefrom.

2. The universal bracket as set forth in claim 1 above, wherein said lock means comprises as at least one aperture formed through said stanchion and a corresponding lock aperture formed in said mount tube, said corresponding apertures adapted to be in registry with one another when said mount tube is mounted on said stanchion, and accommodating a lock bolt inserted therethrough to lockingly engage said mount tube to said stanchion.

3. The universal bracket as set forth in claim 2 above, wherein said stanchion and said mount tube are provided with a plurality of corresponding lock apertures to accommodate the mounting of said mount tube with respect to said stanchion at any one of a number of rotated positions.

4. The universal bracket as set forth in claim 1 above, wherein said first carrying tube is provided with a mounting end for accepting the mount bar of the bicycle rack and a second end, said second end having the second carrying tube mounted at a 90° angle relative thereto.

5. The universal bracket as set forth in claim 1 above, wherein said base plate further includes a lateral support plate mounted at a 90° angle relative to said base support plate along one side edge thereof to provide lateral support for said universal bracket when mounted on a right angle underlying support surface.

6. The universal set bracket as set forth in claim 1 above wherein said second carrying tube is mounted on said first carrying tube at a 90° angle relative thereto and positioned adjacent to said mount tube.

* * * * *